(12) United States Patent
Dierkes

(10) Patent No.: US 11,408,539 B2
(45) Date of Patent: Aug. 9, 2022

(54) RESIN LINE COMPRISED OF A CORRUGATED PIPE

(71) Applicant: Faserverbund Innovations UG (haftungsbeschränkt), Ibbenbüren (DE)

(72) Inventor: Dominik Dierkes, Ibbenbüren (DE)

(73) Assignee: Faserverbund Innovations UG (haftungsbeschränkt), Ibbenbüren (DE)

( * ) Notice: Subject to any disclaimer, the term of this patent is extended or adjusted under 35 U.S.C. 154(b) by 0 days.

(21) Appl. No.: 17/186,474

(22) Filed: Feb. 26, 2021

(65) Prior Publication Data

US 2021/0270398 A1 Sep. 2, 2021

(30) Foreign Application Priority Data

Mar. 2, 2020 (DE) .................... 10 2020 105 558.7

(51) Int. Cl.
*F16L 11/15* (2006.01)
(52) U.S. Cl.
CPC ..................................... *F16L 11/15* (2013.01)
(58) Field of Classification Search
CPC .................................. F16L 11/18; F16L 11/15
USPC .......... 138/121, 122, 177, DIG. 8, 105, 173; 405/36, 43, 45–49
See application file for complete search history.

(56) References Cited

U.S. PATENT DOCUMENTS

| | | | | |
|---|---|---|---|---|
| 980,442 A | * | 1/1911 | Schlafly | E02B 13/00 405/48 |
| 3,681,925 A | * | 8/1972 | Schmunk | E02B 11/005 405/49 |
| 3,849,991 A | * | 11/1974 | Niederwemmer | E02B 13/00 405/38 |
| 4,360,042 A | * | 11/1982 | Fouss | B29C 65/02 138/119 |
| 4,523,613 A | * | 6/1985 | Fouss | E02B 11/005 138/121 |
| 4,624,603 A | * | 11/1986 | Kanao | E02B 11/005 405/49 |
| 6,041,829 A | * | 3/2000 | Chancellor | B01D 61/022 138/177 |

(Continued)

FOREIGN PATENT DOCUMENTS

| | | |
|---|---|---|
| CN | 201240055 | 5/2009 |
| CN | 105196572 | 12/2015 |

(Continued)

*Primary Examiner* — Patrick F Brinson
(74) *Attorney, Agent, or Firm* — Gudrun F. Huckett

(57) ABSTRACT

A resin line is provided with a corrugated pipe that has a wall with individual circumferentially arranged through openings. Sections of the wall are circumferentially closed. The wall has a cross-sectional shape of non-rotational symmetry transverse to a longitudinal center axis and is divided in relation to the cross-sectional shape of non-rotational symmetry into a first part and a second part. The first part has a flattened base extending in a transverse direction transverse to the longitudinal center axis across a length of the corrugated pipe. The second part has an arc shape extending in a direction of height transverse to the longitudinal center axis across the length of the corrugated pipe. The flattened base has a width measured in the transverse direction that is larger than a height of the arc shape measured in the direction of height.

7 Claims, 2 Drawing Sheets

(56) References Cited

U.S. PATENT DOCUMENTS

| | | | | |
|---|---|---|---|---|
| 6,076,992 | A * | 6/2000 | Fukui | E02B 11/005 |
| | | | | 405/43 |
| 6,257,858 | B1 | 7/2001 | Pabsch et al. | |
| 6,461,078 | B1 * | 10/2002 | Presby | B01D 29/52 |
| | | | | 405/49 |
| 10,357,922 | B2 * | 7/2019 | Stephenson | B29C 70/544 |
| 2007/0077122 | A1 * | 4/2007 | Birchler | E03F 1/003 |
| | | | | 405/46 |
| 2008/0079193 | A1 | 4/2008 | Hanks et al. | |
| 2009/0273111 | A1 | 11/2009 | Bansal | |
| 2010/0189973 | A1 | 7/2010 | Mikkelsen et al. | |
| 2017/0225412 | A1 | 8/2017 | Dierkes | |
| 2018/0079115 | A1 | 3/2018 | Aquino et al. | |
| 2018/0128402 | A1 | 5/2018 | Dierkes | |

FOREIGN PATENT DOCUMENTS

| | | |
|---|---|---|
| CN | 205291633 | 6/2016 |
| DE | 102 39 325 | 3/2004 |
| DE | 10 2014 011 787 | 2/2016 |

\* cited by examiner

RESIN LINE COMPRISED OF A CORRUGATED PIPE

BACKGROUND OF THE INVENTION

The invention relates to a resin line comprised of a corrugated pipe with individual through openings arranged in the wall at the circumference.

The vacuum infusion method is disclosed, for example, in DE 102 39 325 B4. For producing a reinforced fiber composite component, the resin line is placed into a tool in order to supply, under vacuum, a liquid matrix material to the reinforcement fibers placed into the tool. The reinforcement fibers can be present as semifinished products in the form of rovings, mats, laid material, webs, multi-axial materials, knit materials, and meshwork, and can be produced from a great variety of fiber materials such as, for example, carbon fibers, glass fibers, aramid fibers, boron fibers or hybrid materials, as well as any combination thereof. The reinforcement fibers are impregnated with the matrix material that is supplied via the resin line. The matrix material fills also the tool mold in this context. As matrix materials, various suitable resin systems can be employed that have a suitable viscosity at the working temperature range and bind well to the reinforcement fibers. After complete impregnation of the reinforcement fibers and filling of the mold chamber, the matrix material cures in the tool. Subsequently, the finished component can be removed from the tool.

A resin line of the aforementioned kind formed of a corrugated pipe is disclosed in US 2018/0128402 A1. Due to the corrugated shape of the wall, the resin line can be laid in a flexible manner. The wall of the resin line that is formed of the corrugated pipe has across its length a changing diameter due to the corrugations. The corrugations of the corrugated pipe provide an increased stiffness and load capacity in the radial direction of the corrugated pipe in comparison to a smooth wall surface. Due to the corrugations of the wall, the corrugated pipe can however be deformed easily in the length direction in accordance with bending radii that the corrugated pipe must assume in order to be laid into a predetermined tool. In this way, a corrugated pipe is an ideal material in order to fulfill the stiffness requirements under the action of vacuum but also in order to fulfill the flexibility requirements in regard to easy placement of a resin line into a tool. Depending on the employed material, the wall thickness of the corrugated pipe can be reduced to a thickness of 0.2 mm to 0.4 mm. The corrugated pipe material can be easily stored and transported as extruded endless material wound onto reels. Corrugated pipe material can be cut to length from the endless strand at any desired length. Waste is thus reduced to a minimum. Usually, a corrugated pipe has a round cross section.

The corrugated pipe comprises individual through openings arranged at the circumference through which the matrix material can pass from the interior of the corrugated pipe to the exterior. The through openings are sized and shaped such that, depending on the viscosity and flow behavior of the employed matrix material and the desired course of the front of the flow within the tool during the impregnation phase, a precisely matched quantity of the matrix material exits at a respective desired location. The through openings can be formed at a corrugation valley but also at a corrugation peak or can extend across a length of one or a plurality of corrugations. They are arranged at such distances along the longitudinal axis of the corrugated pipe that locally in the region of the through opening a smaller proportion of the matrix material transported in the corrugated pipe can flow into the tool and a larger portion of the matrix material can flow past the through opening in the direction of the end of the resin line in the conveying direction in order to achieve a distribution of the matrix material in the tool that is as uniform as possible across the length of the resin line.

US 2010/0189973 A1 discloses a distribution system for matrix material in which the resin lines have a cross-sectional shape corresponding to the letter omega. The resin lines are placed with their feet onto the tool structure. The matrix material exits from the resin line cross section in downward direction in the region of the feet through the slot at the bottom which extends across the entire length of the resin line. Such resin lines are unsuitable for longer conveyance stretches of the matrix material in the tool because the matrix material is non-uniformly distributed. While a large matrix material quantity will already flow at the front section of the resin line into the tool, hardly any matrix material will arrive at a remote end of the resin line; the matrix material that has escaped at the front section begins to cure already while the matrix material has not yet arrived at the remote end of the resin line. Also, the resin lines with an omega cross section are not particularly load-resistant because, when subjected to pressure, they will widen in the region of the longitudinal slot and then collapse.

In regard to known corrugated pipes, the material impressions of the corrugated pipe in the matrix material of the component have been found to be disadvantageous. The resin lines with an omega cross section are obtainable only as rod material because they are not flexible enough to be coiled. Also, it is not possible to lay such resin lines in arcuate courses in a tool.

It is the object of the present invention to provide a resin line which can be produced inexpensively, which suffices in regard to structural requirements under the action of vacuum, which leaves an impression in the matrix material that is as inconspicuous as possible, which can be coiled, and which is flexible so as to be laid in arcuate courses.

SUMMARY OF THE INVENTION

In accordance with the invention, the object is solved fora resin line of the aforementioned kind in that the wall of the corrugated pipe, which is of a closed circumferential configuration at least in sections thereof, comprises transverse to the longitudinal center axis a cross-sectional shape of non-rotational symmetry, in which the wall is divided into a first part with a flattened base which extends in a direction transverse to the longitudinal center axis across the length of the corrugated pipe and into a second part with an arc shape extending in a direction of height transverse to the longitudinal center axis across the length of the corrugated pipe, and the cross-sectional shape with its flattened base as the first part of the wall has a width that is larger than a height measured in the direction of height of the second part of the wall embodied in an arc shape.

Due to its special cross-sectional shape, the resin line is resting on a larger contact surface on the component underneath as a result of the flattened base. Due to the larger contact surface of the flattened base, the resin line does not easily slip while being positioned in the tool. Due to the larger contact surface, the resin line is not pressed with its bottom side so deep into the material of the component and into the matrix material when a vacuum is applied to the tool for flooding the tool with the matrix material. During future removal of the finished component, the resin line can be easily pulled off from the cured surrounding matrix material without leaving behind such visible traces of the resin line as is the case for a round resin line. The impression that is left behind by the resin line in the matrix material is less deep and less conspicuous compared to a resin line that has a round cross section.

The feature that the wall of the corrugated pipe is circumferentially closed at least in sections of the resin line is to be understood such that the resin line in these section has at least no continuous slot extending in the longitudinal direction of the resin line as is the case for resin lines with omega cross section of the resin line; in this way, pressure and tensile forces acting in these sections on the resin line are absorbed and distributed about the circumference of the resin line. In this way, the resin line does not expand under load as is the case in resin lines with the omega cross section of the resin line and therefore also does not collapse so quickly. The wall that is circumferentially closed in sections comprises therefore nonetheless local through openings arranged at distances relative to each other through which the matrix material can escape from the resin line into the tool. The through openings do not weaken the resin line as much the continuous slots in the resin lines with the omega cross section because the resin line, at least around the through openings, is still circumferentially closed. The contact force resulting from the vacuum and acting on the resin line can nonetheless be dissipated very well by the corrugated structure of the corrugated pipe and the arc shape of the wall into the material underneath, for example, the reinforcement fibers of the component to be produced which have been placed into the tool, without the resin line in this context collapsing or the resin flow through the resin line being significantly obstructed or even interrupted thereby.

A resin line that has the described cross-sectional shape can also be easily coiled onto a reel as endless material and, as needed, can be paid out from the reel and cut to the desired length. In case of component lengths of, for example, more than 100 m, as they exist in case of fiber-reinforced rotor blades of wind turbines, it is a significant advantage to process working material from a reel so that it is not required to connect many short pieces to each other. Due to its flexibility along the longitudinal center axis, the resin line can also be laid very well in sections or across the complete length in arc shapes into a tool; this additionally simplifies processing.

The wall of the corrugated pipe is comprised preferably of a stiff material. The corrugated pipe can be produced from thermoplastic plastic material, for example, of polyamide, polyethylene, polyvinyl chloride, polytetrafluoroethylene or polypropylene. In the working temperature range of the matrix material, the employed plastic material should still have a sufficient strength, at least at the beginning when the matrix material begins to flow into the component, in order not to collapse under the action of the vacuum in the tool and/or not to become so soft or so liquid due to the heat of the matrix material or due to the solvents contained therein in such a way that the matrix material no longer is distributed reliably in the tool or that the matrix material becomes contaminated by the material of the corrugated pipe.

Due to the planar contact of the resin line in sections on the material underneath, the matrix material can seep from the resin line directly into the material underneath. In order for the matrix material to seep from the resin line into the material arranged underneath in the tool, through openings are provided advantageously also in the region of the flattened base in the wall. The distances of the through openings from each other as well as the shapes, sizes, and positions of the through openings are selected in particular as a function of the employed matrix material and the size of the component volume that is to be flooded with the matrix material from the resin line. Also, the viscosity and curing rate of the employed matrix material and the conveyance stretches across which the matrix material is to be conveyed are important for selecting the correct arrangement of the through openings. Cavities in the region of spaces that are located in the region of the lateral recesses of resin lines with round cross sections relative to the material underneath are formed easily by coverings that are not completely in contact with the outer surface of the resin line. These cavities can be avoided due to the resin lines designed in accordance with the invention.

A further advantage of the resin lines according to the invention is to be seen in that, due to their larger width in relation to their height, they waste less matrix material during production. In order to supply all regions in a tool with matrix material, a small cross section of the resin lines is sufficient in order to distribute the matrix material. After the tool has been flooded completely with the matrix material, less unused volume of matrix material remains in the resin lines that is be disposed of with the used resin lines.

According to an embodiment of the invention, the flattened base forms a flat or planar surface. The flat or planar surface provides a stable support possibility and a good contact to the material underneath. Through the through openings provided in the flat surface, the matrix material conveyed through the resin line can seep well directly into the material underneath. After curing of the matrix material, the resin lines can be pulled off more easily from the cured component across the planar surfaces.

According to an embodiment of the invention, there are uneven formed portions in the configuration of the flattened base that form at the exterior side of the corrugated pipe at least one flow channel which is pointing away from the through opening. By means of a flow channel, the matrix material is guided away from the corresponding through opening after it has exited through the through opening from the corrugated pipe. When the corrugated pipe with its base is resting on the material located underneath, the material underneath could plug the through openings or at least obstruct the outflow of matrix material out of the corrugated pipe. This holds true in particular when the corrugated pipe is pressed by the applied vacuum against the material underneath. The flow channel simplifies the spreading of the matrix material in the region of the through opening. The flow channel can extend to the lateral rim of the base in order to introduce the matrix material, exiting through the through openings from the corrugated pipe, also in a direction transverse to the longitudinal extension of the corrugated pipe into the tool. However, it may already suffice that the flow channel guides the matrix material only across a portion of the width of the base since the surface area through which the matrix material that has passed through the through openings can seep into the tool is already greatly enlarged thereby. The flow channel can be designed in this context such that in regard to its surface area it extends at least also in a direction at a slant to and/or along the longitudinal extension of the corrugated pipe in order to cover a larger surface area for seeping of the matrix material into the tool.

According to an embodiment of the invention, the second part of the wall which is embodied in an arc shape comprises at least an approximately or precisely semicircular cross-sectional shape. The semicircular shape provides an optimum with regard to statics because through this shape the forces which are acting due to the vacuum in the tool on the resin line can be transmitted well onto the material located underneath the resin line. The wall of the resin line can be embodied with comparatively minimal wall thicknesses so that it is possible to save a lot of plastic material for the resin lines; this reduces the material consumption and the costs as well as environmental load. The semicircular shape also provides a good compromise between a good distribution of the matrix material into the regions of the tool located laterally adjacent to the resin line and to be supplied with the matrix material and the conveying capacity for passing material in the length extension through the resin line.

According to an embodiment of the invention, the ratio of the width to the height of the resin line amounts to at least approximately or precisely 2 to 1. The at least approximately half square ratio enables a sufficiently high throughput performance of the resin line while providing good conveyance and discharge of the material in a direction transverse to the longitudinal center axis of the resin line. A resin line could have, for example, a width of 35 mm and a height of 17.5 mm. With such resin lines, tools can be supplied very efficiently with matrix material.

According to an embodiment of the invention, the wall of the resin line is made of polyvinyl chloride. Since a wall of polyvinyl chloride (PVC) in case of a greater heat acting on it becomes soft and permeable for the matrix material, the wall may collapse due to heat exposure in case of an exothermic reaction of the matrix material in the tool. The PVC and/or the matrix material can be adjusted such that the exothermic reaction begins at a point in time only after the infusion of the matrix material into the tool has already been completed. The residual matrix material still contained in the resin line is pushed upon collapse of the resin line out of the latter. This matrix material can therefore flow unhindered into the tool and can still be utilized for manufacturing a component. The resin line itself collapses on itself. Since it frequently does not project or at least hardly projects past the surrounding surface of the tool, the specific pressure that is acting through the vacuum on the resin line is reduced. In this way, the resin line with its bottom side is no longer forced so strongly into the surface of the component so that hardly any pressure marking of the resin line can be found thereat when the resin line is removed therefrom after curing of the matrix material.

According to an embodiment of the invention, the wall is produced from polypropylene. Polypropylene as a material is more heat resistant in comparison to other plastic materials so that the resin line produced therefrom does not collapse even for a greater heat developed in the tool, for example, heat from an exothermic reaction of the matrix material and the thus caused heating of the wall. Such a material selection is advantageous when the resin line must convey the matrix material across a greater conveying stretch and/or a great quantity of heat from the exothermic reaction of the matrix material is produced and the resin line must not collapse thereby.

It is expressly noted that the afore described configurations of the invention, each for themselves but also in any suitable combination with each other, can be combined with the subject matter of the independent claim.

Further advantageous modifications and embodiments of the invention can be taken from the following subject matter description of the drawings.

The invention will be explained in the following with the aid of an embodiment in more detail.

DESCRIPTION OF THE PREFERRED EMBODIMENTS

Figure 1:
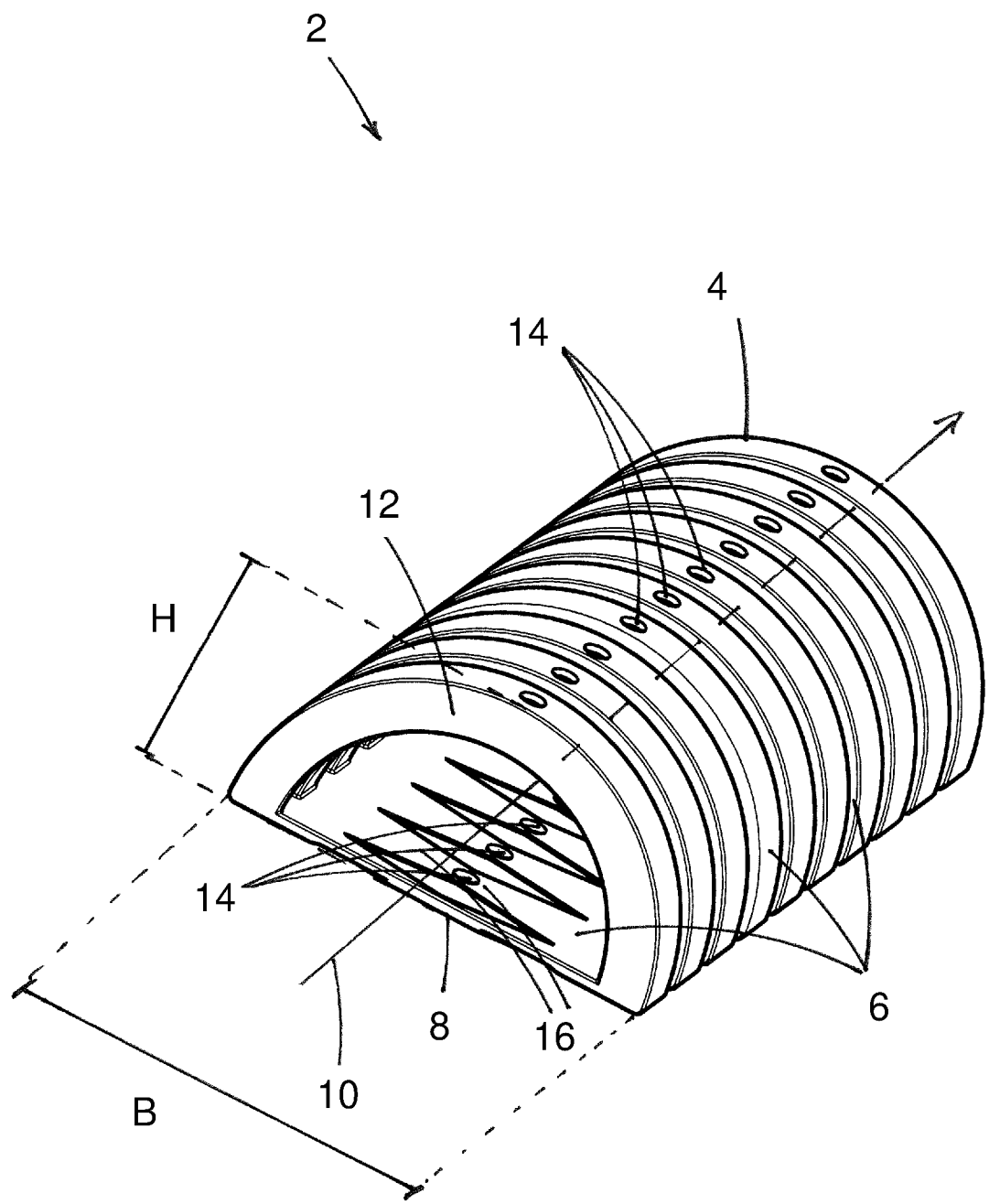
FIG. 1 is a perspective view from above onto a corrugated pipe that forms a resin line.

FIG. 1 shows a section of a resin line 2 that is formed of a corrugated pipe 4. The corrugated pipe 4 comprises a wall of a material that is embodied in corrugations. The corrugations can be rounded in this context or, as shown in the embodiment, can be provided with an angular cross-sectional shape of the corrugation. It is important that the wall 6 is not smooth but, due to a corrugated shape enables bending of the corrugated pipe 4 without this causing kinks in the wall 6 that would obstruct the flow of material and would lead to leakages in the wall 6.

In the perspective view from above, one can see that the corrugated pipe 4, transverse to the longitudinal center axis 10, has a cross-sectional shape of non-rotational symmetry in that the wall 6 is divided into two parts. In a first part, the wall 6 is provided along the circumference of the wall 6 with a flattened base 8 that extends in a direction transverse to the longitudinal center axis 10 across the length of the corrugated pipe 4. In the second part, the wall 6 is formed in the circumferential direction in an arc shape 12 extending in a direction of height H transverse to the longitudinal center axis 10 across the length of the corrugated pipe 4. In this context, the cross-sectional shape with its flattened base 8 as the first part of the wall 6 has a width B that is larger than the height H of the second part of the wall 6 that is embodied in an arc shape 12.

The wall 6 of the corrugated pipe 4 is closed at least in some sections in circumferential direction along the longitudinal center axis 10. At some positions, there are however through openings 14 through which the matrix material can exit from the interior of the corrugated pipe 4 to the exterior and into the tool. In the embodiment, a row of through openings 14 is provided at the uppermost end of the arc shape 12 and a further row is provided in the central region of the base 8. Depending on the application, more or fewer through openings 14 can be formed in the corrugated pipe 4. The through openings 14 can also be arranged at other locations along the circumference of the corrugated pipe 4, and several through openings 14 can also be arranged about the circumference of the corrugated pipe 4 and in alternating positions and/or alternating distances relative to each other.

The matrix material flows along the longitudinal center axis 10 through the corrugated pipe 4. Due to the vacuum in the tool, the matrix material is sucked through the through openings 14 into the tool. The through openings 14 are however so small in comparison to the channel cross section of the corrugated pipe 4 that at the location of the through openings 14 only a portion of the matrix material flowing through the corrugated pipe 4 can pass into the tool. The remainder of the matrix material flow which flows through the corrugated pipe 4 moves farther through the corrugated pipe 4 to the additional through openings 14 which are positioned downstream so that the matrix material also reaches remote regions of the tool in the flow direction. With an appropriate placement of the corrugated pipe 4 in a tool, all regions of the tool can be reached by and flooded with the matrix material by means of the corrugated pipe 4.

Figure 2:
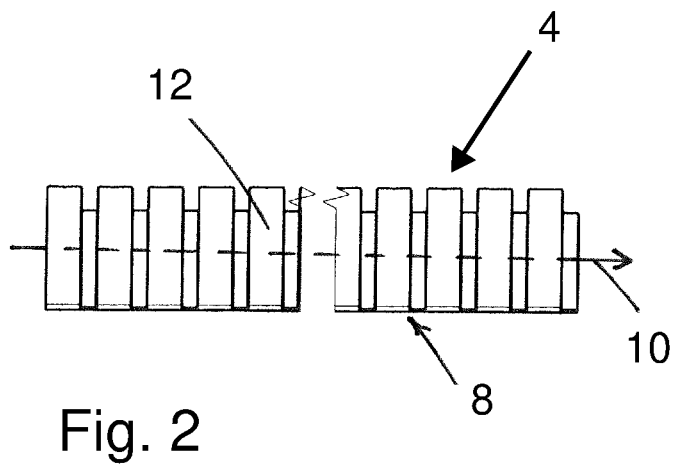
FIG. 2 is a side view of a corrugated pipe.

In FIG. 2, the corrugated pipe 4 is shown in a side view. In this side view, the corrugated structure of the second part of the wall 6 formed in an arc shape can be seen well. Due to the indentations of the wall 6 in the region of the individual corrugations, it is possible to lay the corrugated pipe 4 in an arc shape without this causing kinks in the wall 6 of the corrugated pipe 4. The corrugated pipe 4 can thus be transported and stored also as endless material, for example, wound onto reels. In production, the endless strand of the corrugated pipe 4 can then be removed (paid out) from the reel. In this way, a very easy handling of the corrugated pipe 4 for preparing a tool for supply of matrix material is possible.

Figure 3:
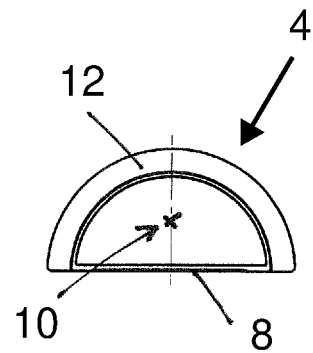
FIG. 3 is a front view of a corrugated pipe.

In FIG. 3, a view from the front onto the corrugated pipe 4 is shown. In this view, it can be easily seen that the flattened base 8 in this embodiment is embodied as a planar surface. Above it, the second part of the wall 6 formed in an arc shape 12 is projecting upwardly in a semicircular form.

Figure 4:
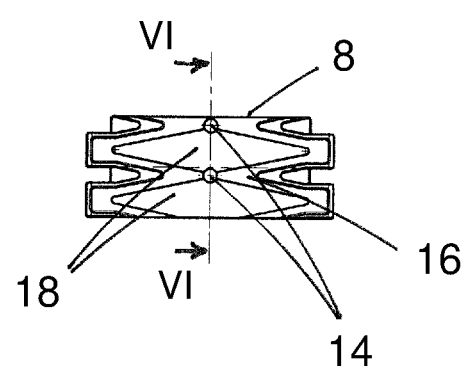
FIG. 4 is a bottom view of a corrugated pipe.

In FIG. 4, a view from below onto the flattened base 8 of the corrugated pipe 4 is illustrated. In the view from below onto the flattened base 8, it can be seen that the bottom is provided with slight irregularities by means of which flow channels 16 are formed in the bottom. The configuration of the flattened base 8 thus has uneven formed portions that on the exterior side of the corrugated pipe 4 form at least one flow channel 16 which is leading away from the through opening 14. Through the flow channel 16, the matrix material is guided away from the corresponding through opening 14 after it has exited through the through opening 14 from the corrugated pipe 4. When the corrugated pipe 4 with its base 8 is resting on a material positioned underneath it in the tool, the material underneath could plug the through opening 14 or at least could obstruct flow of matrix material out of the corrugated pipe 4. The flow channel 16 simplifies spreading of the matrix material in the region of the through opening 14. The flow channel 16 can extend to the lateral rim of the base 8 in order to guide the matrix material that has exited through the through opening 14 from the corrugated pipe 4 also in a direction transverse to the length extension of the corrugated pipe 4 into the tool. However, it may already be sufficient that the flow channel 14 guides the matrix material only across a portion of the width of the base 8 whereby however the surface area across which the matrix material, after passing through the through openings 14, can seep into the tool is already greatly enlarged. The flow channel 16 can be embodied in this context such that its surface extends at least also in a direction at a slant to and/or along the length extension of the corrugated pipe 4 in order to cover a larger surface area that enables seepage of the matrix material into the tool. Parts of the bottom surface of the flattened base 8 are formed as elevations 18 and the matrix material can flow and drain along their surfaces. The elevations 18 form the channel walls of the flow channels 16. They must not be formed to project transversely to the longitudinal axis of the corrugated pipe 4 but can also be positioned at a steeper or flatter angle so that they form a kind of roof above a flow channel 16 by means of which the free cross section of a flow channel 16 across its length is designed differently.

Figure 5:
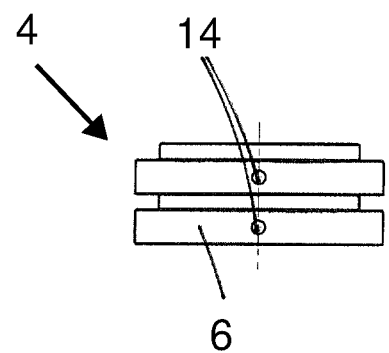
FIG. 5 is a plan view of a corrugated pipe.

In FIG. 5, a plan view of a corrugated pipe 4 is illustrated. In the plan view, it can be seen that the through openings 14 are located only in partial sections of the wall 6. The wall 6 is closed in circumferential direction in the sections of the corrugated pipe 4 between the through openings 14.

Figure 6:
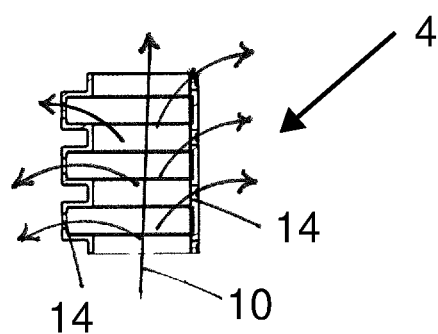
FIG. 6 is a section view of the corrugated pipe along the section line VI-VI of FIG. 4.

In the cross section view illustrated in FIG. 6 taken along the line VI-VI in FIG. 4, it can be seen with the aid of the illustrated arrows how the matrix material upon its passage through the corrugated pipe 4 exits through the through openings 14 to the exterior into the tool.

In the afore described embodiment, the corrugated pipe 4 has a semicircular cross-sectional shape. In deviation from the precise semicircular cross-sectional shape, the cross section can also be compressed or stretched so that the height/width ratio of the first and second parts of the wall 6 relative to each other changes. The deviations from the semicircular shape can have an advantageous effect on the processing of the corrugated pipe 4 and the distribution of the matrix material in the tool.

In the embodiment, the ratio of width B to height H of the resin line is 2 to 1. This ratio would change when the cross-sectional shape of the corrugated pipe would be correspondingly changed.

The invention is not limited to the afore described embodiment. A person of skill in the art will have no difficulties in modifying the embodiment in a manner that appears suitable to him in order to adapt it to concrete requirements of an application.

The specification incorporates by reference the entire disclosure of German priority document 10 2020 105 558.7 having a filing date of Mar. 2, 2020.

While specific embodiments of the invention have been shown and described in detail to illustrate the inventive principles, it will be understood that the invention may be embodied otherwise without departing from such principles.

What is claimed is:

1. A resin line comprising:
   a corrugated pipe comprising a wall comprising individual circumferentially arranged through openings and comprising sections that are circumferentially closed;
   wherein the wall comprises a cross-sectional shape of non-rotational symmetry transverse to a longitudinal center axis and is divided in relation to the cross-sectional shape of non-rotational symmetry into a first part and a second part;
   wherein the first part comprises a flattened base extending in a transverse direction transverse to the longitudinal center axis across a length of the corrugated pipe;
   wherein the second part comprises an arc shape extending in a direction of height transverse to the longitudinal center axis across the length of the corrugated pipe;
   wherein the flattened base has a width measured in the transverse direction that is larger than a height of the arc shape measured in the direction of height;
   wherein the flattened base comprises uneven formed portions that, at an exterior side of the corrugated pipe, form at least one flow channel associated with the through openings and leading away from the through openings.

2. The resin line according to claim 1, wherein the arc shape is approximately semicircular.

3. The resin line according to claim 1, wherein the arc shape is semicircular.

4. The resin line according to claim 1, wherein a ratio of the width relative to the height is at least approximately 2 to 1.

5. The resin line according to claim 1, wherein a ratio of the width relative to the height is 2 to 1.

6. The resin line according to claim 1, wherein the wall is comprised of polyvinyl chloride.

7. The resin line according to claim 1, wherein the wall is comprised of polypropylene.

* * * * *